(12) United States Patent
Ogawa (10) Patent No.: US 9,307,099 B2
(45) Date of Patent: Apr. 5, 2016

(54) TRANSFER-SIDE FACSIMILE MACHINE, FACSIMILE COMMUNICATION SYSTEM AND RECEPTION-SIDE FACSIMILE MACHINE (71) Applicant: KYOCERA Document Solutions Inc., Osaka (JP)

(72) Inventor: Shinya Ogawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/668,398

(22) Filed: Mar. 25, 2015

(65) Prior Publication Data

US 2015/0281472 A1 Oct. 1, 2015

(30) Foreign Application Priority Data

Mar. 31, 2014 (JP) ................................. 2014-071394

(51) Int. Cl.
*G06K 15/00* (2006.01)
*G06F 3/12* (2006.01)
*H04N 1/00* (2006.01)

(52) U.S. Cl.
CPC ................................. *H04N 1/00095* (2013.01)

(58) Field of Classification Search
None
See application file for complete search history.

(56) References Cited

U.S. PATENT DOCUMENTS

| | | | | | |
|---|---|---|---|---|---|
| 5,349,447 | A | * | 9/1994 | Kuwahara | H04N 1/32005 358/400 |
| 5,357,245 | A | * | 10/1994 | Hagiwara | H04L 12/24 340/10.52 |
| 5,473,691 | A | * | 12/1995 | Menezes | H04L 29/06 358/440 |
| 5,519,768 | A | * | 5/1996 | Moquin | H04M 3/4228 379/100.01 |
| 5,552,901 | A | * | 9/1996 | Kikuchi | H04N 1/00204 358/442 |
| 5,633,731 | A | * | 5/1997 | Maemura | H04N 1/32363 358/403 |
| 5,638,384 | A | * | 6/1997 | Hayashi | H04L 1/0007 714/752 |
| 5,657,136 | A | * | 8/1997 | Maei | H04N 1/00 358/434 |
| 5,887,216 | A | * | 3/1999 | Motoyama | G06F 11/0709 358/1.15 |
| 5,936,744 | A | * | 8/1999 | Choi | H04N 1/327 358/400 |

(Continued)

FOREIGN PATENT DOCUMENTS

| | | |
|---|---|---|
| JP | U H 4-8571 | 1/1992 |
| JP | U H 4 8573 | 1/1992 |
| JP | H 6-30230 A | 2/1994 |

*Primary Examiner* — Madelein Nguyen
(74) *Attorney, Agent, or Firm* — Stein IP, LLC (57) ABSTRACT

A multifunctional machine includes a facsimile communication portion and a control portion that makes the facsimile communication portion transfer facsimile data to a reception-side facsimile machine. When the facsimile communication portion starts to perform communication for data transfer with the reception-side facsimile machine, the facsimile communication portion receives, from the reception-side facsimile machine, a reception allowance/rejection signal in conformity with a facsimile communication protocol. When the control portion indicates the reception allowance of the transfer of the reception allowance/rejection signal, the facsimile communication portion is made to transfer the facsimile data to the reception-side facsimile machine.

12 Claims, 8 Drawing Sheets

(56) References Cited

U.S. PATENT DOCUMENTS

| | | | | |
|---|---|---|---|---|
| 5,940,189 | A * | 8/1999 | Matsubara | G06K 9/3216 358/400 |
| 6,404,761 | B1 * | 6/2002 | Snelling | H04W 84/16 370/338 |
| 6,456,400 | B1 * | 9/2002 | Ikegami | H04N 1/00204 358/405 |
| 6,611,354 | B1 * | 8/2003 | Nakahara | H04N 1/32005 358/1.9 |
| 6,738,462 | B1 * | 5/2004 | Brunson | H04L 12/589 379/142.04 |
| 6,775,033 | B1 * | 8/2004 | Nobuta | H04N 1/33307 358/426.16 |
| 7,042,584 | B1 * | 5/2006 | Watanabe | H04N 1/00915 358/1.15 |
| 7,256,904 | B1 * | 8/2007 | Shima | G06K 15/00 358/1.13 |
| 7,355,988 | B1 * | 4/2008 | Denbar | H04M 3/5307 370/282 |
| 7,382,476 | B1 * | 6/2008 | Maemura | H04N 1/32005 358/1.15 |
| 7,979,726 | B2 * | 7/2011 | Nakamura | G06F 1/3215 358/1.15 |
| 8,099,046 | B2 * | 1/2012 | Helferich | G06Q 10/063 340/7.23 |
| 8,717,616 | B2 * | 5/2014 | Okada | H04N 1/00543 345/156 |
| 2001/0024497 | A1 * | 9/2001 | Campbell | H04M 3/5125 379/265.09 |
| 2002/0090933 | A1 * | 7/2002 | Rouse | H04M 3/493 455/412.1 |
| 2003/0233244 | A1 * | 12/2003 | Kumhyr | G06Q 10/08 705/5 |
| 2004/0184066 | A1 * | 9/2004 | Urabe | G03G 15/5079 358/1.14 |
| 2005/0085250 | A1 * | 4/2005 | Lee | H04N 76/025 455/509 |
| 2006/0290971 | A1 * | 12/2006 | McQuillan | G06F 3/121 358/1.15 |
| 2007/0124421 | A1 * | 5/2007 | Tashiro | H04N 1/00 709/217 |
| 2007/0166685 | A1 * | 7/2007 | Gilbert | G09B 7/00 434/323 |
| 2008/0112008 | A1 * | 5/2008 | Kikugawa | G06F 21/608 358/1.15 |
| 2008/0239408 | A1 * | 10/2008 | Urakawa | H04N 1/00912 358/435 |
| 2009/0058635 | A1 * | 3/2009 | LaLonde | A61N 1/37282 340/539.11 |
| 2011/0116419 | A1 * | 5/2011 | Cholas | H04L 65/1036 370/259 |
| 2011/0279865 | A1 * | 11/2011 | Hymas | G03G 15/553 358/1.15 |
| 2013/0198671 | A1 * | 8/2013 | Kasai | G06F 3/0482 715/771 |
| 2014/0050101 | A1 * | 2/2014 | Ulybin | H04L 41/5038 370/242 |
| 2015/0193183 | A1 * | 7/2015 | Ichikawa | G06F 3/1292 358/1.15 |
| 2015/0244849 | A1 * | 8/2015 | Joao | H04M 1/663 455/415 |

* cited by examiner

TRANSFER-SIDE FACSIMILE MACHINE, FACSIMILE COMMUNICATION SYSTEM AND RECEPTION-SIDE FACSIMILE MACHINE

This application is based upon and claims the benefit of priority from the corresponding Japanese Patent Application No. 2014-071394 filed on Mar. 31, 2014, the entire contents of which are incorporated herein by reference.

BACKGROUND

The present disclosure relates to a transfer-side facsimile machine, a facsimile communication system and a reception-side facsimile machine, and more particularly to a technology for transferring facsimile data between facsimile machines.

There is a facsimile machine that has the function of transferring, when receiving facsimile data, the received facsimile data to another facsimile machine which is previously set at a transfer destination. For example, a facsimile machine is known that is set at a workplace and that transfers, after a user has returned home, received facsimile data to a facsimile machine at the user's home. A technology is also known in which when the number of times redialing for transfer from a transmitter to a receiver is performed reaches a given number of times, image information is transferred to another receiver which is set, and at the time of the transfer, the transmitter notifies the information that the image information is transferred to the other receiver to the receiver on which the transmission was first attempted.

However, the above-described facsimile machine that performs the transfer to the home never fails to transfer, when a setting is made such that the data transfer is performed, the facsimile data to the transfer destination. In this case, while the user is going to the workplace from the home, when the facsimile machine at the workplace receives facsimile data which is a target to be transferred, the facsimile data is transferred to the facsimile machine at home. After the user arrives at the workplace, it is impossible to receive the facsimile data at the workplace.

When the transfer destination is assumed to be the facsimile machine at home, and the power of this facsimile machine is turned off, the facsimile data which attempts to be transferred from the transmitter serving as the transfer-side facsimile machine is transferred to another facsimile machine. Hence, the facsimile machine at home receives the facsimile data, and thus it is possible to avoid a problem in which the user cannot receive an image on the facsimile data at a desired place. However, when the transmitter dials to a plurality of facsimile machines many times, since in the meantime, the facsimile data which is a target to be transferred continues to be held in the internal memory of the facsimile machine, a memory of a large capacity is needed, with the result that the cost of the facsimile machine is disadvantageously increased.

SUMMARY

A transfer-side facsimile machine according to one aspect of the present disclosure includes a transfer-side facsimile communication portion that performs facsimile communication and a transfer-side control portion that makes the transfer-side facsimile communication portion transfer, when facsimile data which is a target to be transferred to a reception-side facsimile machine is received, the received facsimile data to the reception-side facsimile machine. When the transfer-side facsimile communication portion starts to communicate with the reception-side facsimile machine under control of the transfer-side control portion so as to transfer the received facsimile data, the transfer-side facsimile communication portion receives, from the reception-side facsimile machine, a reception allowance/rejection signal that indicates the detail of the reception allowance/rejection of the facsimile data transferred from the transfer-side facsimile machine and that uses a communication signal in a previously determined facsimile communication protocol. When the reception allowance/rejection signal received by the transfer-side facsimile communication portion indicates the reception allowance of the facsimile data which is the target to be transferred, the transfer-side control portion makes the transfer-side facsimile communication portion transfer the facsimile data which is the target to be transferred to the reception-side facsimile machine.

A facsimile communication system according to further another aspect of the present disclosure includes the transfer-side facsimile machine and the reception-side facsimile machine described above. The reception-side facsimile machine includes a reception allowance/rejection setting portion that sets reception allowance/rejection indicating whether or not the facsimile data which is transferred from the transfer-side facsimile machine and which is the target to be transferred is received, a reception-side facsimile communication portion that performs facsimile communication and a reception-side control portion that transmits, from the reception-side facsimile communication portion to the transfer-side facsimile machine, a reception allowance/rejection signal which indicates, when the facsimile communication with the transfer-side facsimile machine is established by the reception-side facsimile communication portion according to calling from the transfer-side facsimile machine, the detail of the reception allowance/rejection set by the reception allowance/rejection setting portion and which uses the communication signal in the previously determined facsimile communication protocol.

A reception-side facsimile machine according to further another aspect of the present disclosure includes a reception allowance/rejection setting portion that sets reception allowance/rejection indicating whether or not transfer data transferred from the transfer-side facsimile machine is received, a reception-side facsimile communication portion that performs facsimile communication with the transfer-side facsimile machine and a reception-side control portion that transmits, from the reception-side facsimile communication portion to the transfer-side facsimile machine, a reception allowance/rejection signal which indicates, when the facsimile communication with the transfer-side facsimile machine is established by the reception-side facsimile communication portion in response to calling from the transfer-side facsimile machine, the detail of the reception allowance/rejection set by the reception allowance/rejection setting portion and which uses a communication signal in a previously determined facsimile communication protocol.

Further features and advantages of the present invention will become apparent from the description of embodiments given below.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
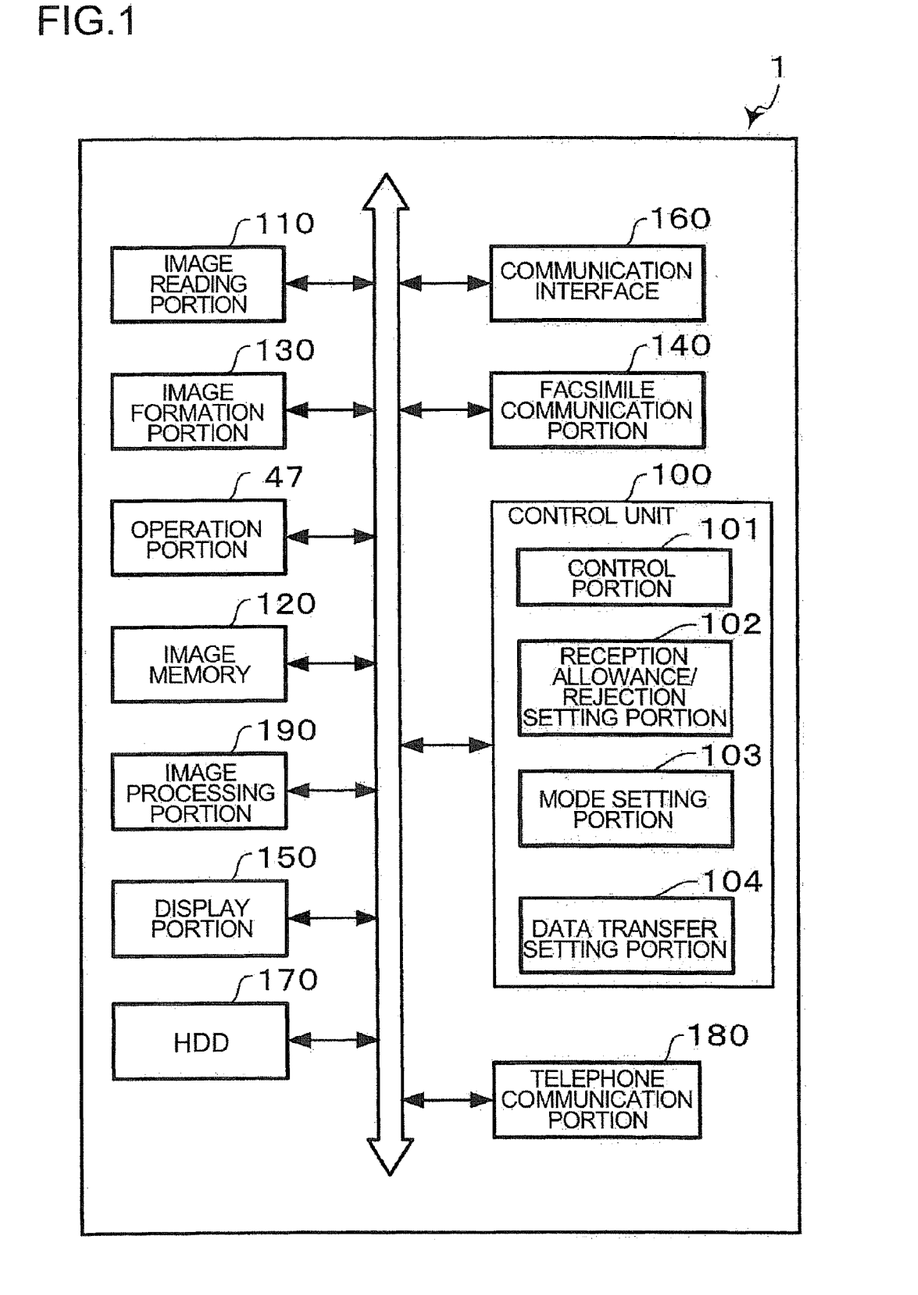
FIG. 1 A block diagram schematically showing the internal configuration of a multifunctional machine serving as a facsimile machine according to a first embodiment of the present disclosure.

A facsimile machine, a facsimile communication system and a facsimile communication program according to embodiments of the present disclosure will be described below with reference to drawings. A facsimile machine according to a first embodiment of the present disclosure will first be described. FIG. 1 is a block diagram schematically showing the internal configuration of a multifunctional machine serving as a facsimile machine according to the first embodiment of the present disclosure.

The multifunctional machine 1 according to the first embodiment includes a control unit 100, an image reading portion 110, an image memory 120, an image formation portion 130 and a facsimile communication portion 140.

The image reading portion 110 has a scanner that reads an original document to acquire an original document image. The image reading portion 110 includes: the scanner that reads an original document placed on an original document placement stage and the image of an original document which is transported; and an AFD (Auto Document Feeder) that has an ejection mechanism for ejecting an original document which has been read. The image reading portion 110 reads original documents that are a target for facsimile transmission one by one, and thereby acquires, as data that is the target for facsimile transmission, data (original document image) on the original document of each page together with its page information on an individual page basis.

The image memory 120 is a region that temporarily stores various types of data such as data on the original document read by the image reading portion 110, data that is acquired by the facsimile communication portion 140 or a communication interface 160 and that is the target for facsimile transmission and data that is a target to be printed by the image formation portion 130.

The image formation portion 130 reads data stored in the image memory 120 that is data on the original document read by the image reading portion 110 and is data received by another facsimile machine through a public line with the facsimile communication portion 140, and uses the data to perform image formation (printing).

The facsimile communication portion 140 performs functions necessary for facsimile transmission to transmit and receive image data to and from an external facsimile machine through the public line. For example, a control portion 101 reads, in order of pages, data on the original document of each page that is read for facsimile transmission by the image reading portion 110 and that is temporarily stored in the image memory 120. The facsimile communication portion 140 is made to perform facsimile transmission toward the facsimile machine of a specified destination through an operation of an operation portion 47 by a user. The facsimile communication portion 140 of a reception-side facsimile machine, which will be described later, is an example of a reception-side facsimile communication portion in the scope of claims, and the facsimile communication portion 140 of a transfer-side facsimile machine, which will be described later, is an example of a transfer-side facsimile communication portion in the scope of claims.

A telephone communication portion 180 performs the function of performing call communication with another telephone through the public line.

The multifunctional machine 1 further includes an image processing portion 190 that performs edition, processing and the like on the image read by the image reading portion 110. The multifunctional machine 1 also includes a communication interface 160 for communicating various types of data between another personal computer and a server that are connected through a multifunctional machine network.

The control unit 100 includes a CPU, a ROM and a RAM, and manages the overall operation of the multifunctional machine 1. The control unit 100 includes the control portion 101, a reception allowance/rejection setting portion 102, a mode setting portion 103 and a data transfer setting portion 104. The facsimile communication program of the multifunctional machine 1 is stored in a HDD 170 or the unillustrated ROM. The control unit 100 is operated according to the facsimile communication program, and thereby functions as the control portion 101, the reception allowance/rejection setting portion 102, the mode setting portion 103 and the data transfer setting portion 104 on the function of performing facsimile data transfer processing. However, the control portion 101, the reception allowance/rejection setting portion 102, the mode setting portion 103 and the data transfer setting portion 104 may be individually formed with a hardware circuit regardless of the operation based on the facsimile communication program. In the following description, the same is true in each embodiment unless otherwise particularly stated.

The control portion 101 manages the overall operation of the multifunctional machine 1. The control portion 101 also performs processing on facsimile data transfer, which will be described later. The control portion 101 of the reception-side facsimile machine, which will be described later, is an example of a reception-side control portion in the scope of claims, and the control portion 101 of the transfer-side facsimile machine, which will be described later, is an example of a transfer-side control portion in the scope of claims. In other words, the multifunctional machine 1 can be used as the transfer-side facsimile machine or the multifunctional machine can also be used as the reception-side facsimile machine.

The reception allowance/rejection setting portion 102 sets reception allowance/rejection indicating whether or not the transfer data is received through the public line from another facsimile machine (hereinafter referred to as the "transfer-side facsimile machine") that transfers facsimile data. For example, when the reception allowance/rejection setting portion 102 makes a setting such that the transfer data from the transfer-side facsimile machine is received, the reception allowance/rejection setting portion 102 stores a state (transfer reception flag=1 (true)) where a transfer reception flag is set whereas when the reception allowance/rejection setting portion 102 makes a setting such that the transfer data is not received, the reception allowance/rejection setting portion 102 stores a state (transfer reception flag=0 (false)) where the transfer reception flag is not set. The reception allowance/rejection setting portion 102 is included such that the multifunctional machine 1 functions as the reception-side facsimile machine.

When facsimile communication with the transfer-side facsimile machine is established by the facsimile communication portion 140, the control portion 101 transmits a reception allowance/rejection signal indicating the detail of the reception allowance/rejection set by the reception allowance/rejection setting portion 102, using a previously determined facsimile communication protocol, from the multifunctional machine 1 to the transfer-side facsimile machine. In the present embodiment, as the previously determined protocol, T. 30 protocol is used, and a description will be given of an example where an NSS signal serving as a communication signal in the protocol is the reception allowance/rejection signal.

When facsimile communication with the transfer-side facsimile machine is performed, the control portion 101 makes the facsimile communication portion 140 transmit, together with the reception allowance/rejection signal, to the transfer-side facsimile machine, a communication type signal indicating which one of (1) normal facsimile communication and (2) communication for transmitting the reception allowance/rejection signal the communication performed between the machines is.

The mode setting portion 103 sets the multifunctional machine 1 to an answering machine mode. The answering machine mode refers to a mode in which a voice message from a communication destination received by the telephone communication portion 180 when the user cannot receive a call is recorded as voice data in a memory incorporated in the control unit 100. The control portion 101 operates and controls the multifunctional machine 1 in the answering machine mode.

The reception allowance/rejection setting portion 102 described above determines whether or not the multifunctional machine 1 is set by the mode setting portion 103 to the answering machine mode, and when it is not set to the answering machine mode, the reception allowance/rejection setting portion 102 sets the transfer reception flag. When the multifunctional machine 1 is set to the answering machine mode, the reception allowance/rejection setting portion 102 does not set the transfer reception flag.

The data transfer setting portion 104 is provided such that the multifunctional machine 1 functions as the transfer-side facsimile machine which transfers the facsimile data to another facsimile machine (the reception-side facsimile machine). When the facsimile communication portion 140 receives the reception allowance/rejection signal from the other facsimile machine, the data transfer setting portion 104 sets, according to the detail of the reception allowance/rejection of the transfer data indicated by the reception allowance/rejection signal, whether or not the multifunctional machine 1 is made to perform the data transfer to the other facsimile maine. Specifically, when the reception allowance/rejection signal indicates transfer reception allowance, the data transfer setting portion 104 sets and stores a data transfer flag (data transfer flag=1 (true)) such that the facsimile data which is a target to be transferred is transferred from the facsimile communication portion 140 to the other facsimile machine which transmits the reception allowance/rejection signal. On the other hand, when the reception allowance/rejection signal indicates transfer reception rejection, the data transfer setting portion 104 does not set the transfer reception flag (data transfer flag=0 (false)) and stores this state such that the facsimile data which is a target to be transferred is prevented from being transferred to the other facsimile machine which transmits the reception allowance/rejection signal.

When facsimile communication with the other facsimile machine is established, the data transfer setting portion 104 determines whether or not the communication type signal received by the facsimile communication portion 140 together with the reception allowance/rejection signal is transfer setting communication for setting the data transfer by the facsimile communication. Then, the data transfer setting portion 104 makes a setting corresponding to the detail of the reception allowance/rejection of the transfer data indicated by the reception allowance/rejection signal. The communication type signal is a signal that indicates, to the facsimile communication portion 140, which one of (a) normal facsimile communication and (b) communication for transmitting the reception allowance/rejection signal the reception allowance/rejection signal is.

When the multifunctional machine 1 receives, from the other facsimile machine, as the transfer-side facsimile machine, facsimile data which is a target to be transferred to the facsimile communication portion 140, the control portion 101 transfers, in a case where the data transfer flag is set by the data transfer setting portion 104, the received facsimile data which is a target to be transferred, to the facsimile communication portion 140 of the facsimile machine which is previously determined as a transfer destination and which transmits the reception allowance/rejection signal.

Figure 2:
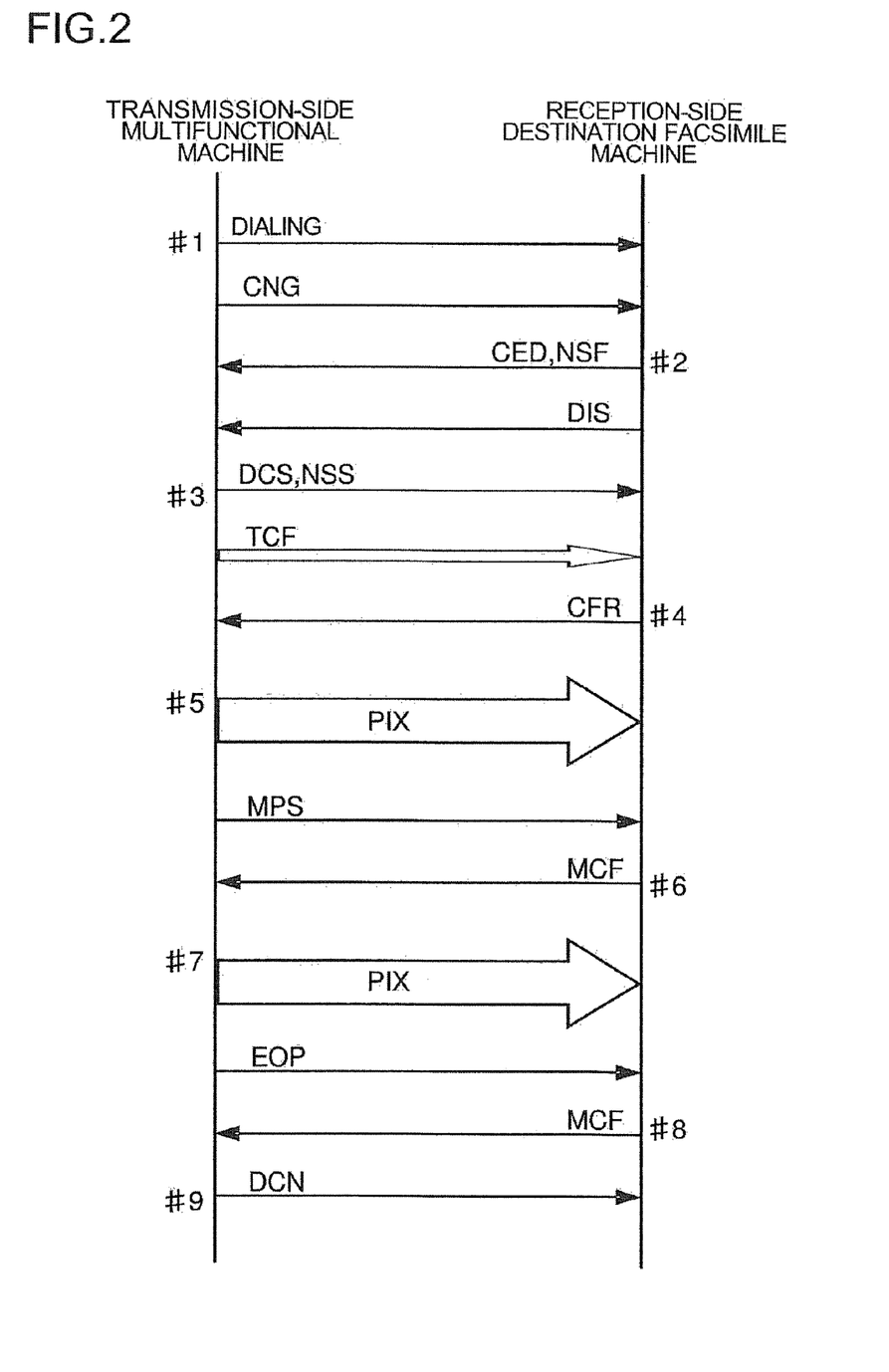
FIG. 2 A diagram showing facsimile communication processing between the multifunctional machine and the facsimile machine which is the destination of facsimile transmission.

The basic flow of facsimile communication processing between the multifunctional machine 1 and the facsimile machine which is the destination of facsimile transmission will then be described. FIG. 2 is a diagram showing the facsimile communication processing between the multifunctional machine 1 and the facsimile machine which is the destination of the facsimile transmission.

The facsimile communication portion 140 (hereinafter simply referred to as the "multifunctional machine 1" in the description of the facsimile communication processing) of the multifunctional machine 1 on the transmission side is called by dialing based on a facsimile transmission instruction (that is, a facsimile transmission job) input through the operation of the operation portion 47 by the user, and transmits a CNG signal. In this way, the multifunctional machine 1 notifies the facsimile machine of the destination that the multifunctional machine 1 is the facsimile machine for performing the facsimile transmission (#1).

When in the facsimile machine of the destination, its facsimile communication portion (hereinafter simply referred to as a "destination facsimile machine" in the description of the facsimile communication processing) receives the CNG signal as the reception side, the destination facsimile machine returns, to the multifunctional machine 1, a CED signal serving as a response signal thereto, an NSF signal serving as a non-standard function identification signal indicating an optional function of itself and a DIS signal notifying the machine function (such as CCITT specifications) on the reception side (#2). The NSF signal is a message signal of the T. 30 protocol used in the facsimile machine to notify a special facility which is not a specific standard system.

The multifunctional machine 1 (the calling side) that receives the CED signal, the NSF signal and the DIS signal from the destination facsimile machine sends out, to the destination facsimile machine, a DCS signal notifying the set-up data (such as the CCITT specifications) of the multifunctional machine 1, an NSS signal serving as a non-standard function identification signal in response to the NFS signal and a TCF signal for modem training (#3). In other words, since the special facility is notified from the facsimile machine of the destination by the NSF signal, when the function corresponding to the special facility is present in itself, the information that it is possible to handle it is notified by the NSS signal from the facsimile machine (the multifunctional machine 1) on the calling side to the facsimile machine of the destination. In the present embodiment, information necessary for the data transfer, which will be described later, is added to the NSF signal and the NSS signal described above and then they are communicated.

The destination facsimile machine that receives the DCS signal, the NSS signal and the TCF signal described above returns, to the multifunctional machine 1, a CFR signal indicating that the reception is successfully performed (#4).

When the multifunctional machine 1 receives the CFR signal as the transmission side, data (PIX) on the first page which is a target for facsimile transmission is transmitted by the facsimile transmission job to the destination facsimile machine (#5). Furthermore, when data on another page which is a target for facsimile transmission is present, the multifunctional machine 1 transmits, to the destination facsimile machine, a MPS signal indicating that the other data is present.

The destination facsimile machine serving as the reception side temporarily stores the received data (PIX) on the first page in the image memory. Then, the destination facsimile machine transmits, to the multifunctional machine 1, a MCF signal indicating that the data on the first page is correctly received (#6).

When the multifunctional machine 1 receives the MCF signal from the destination facsimile machine, and then the data on the subsequent page which is a target for facsimile transmission is present, the multifunctional machine 1 transmits the data (PIX) on the subsequent page and the MPS signal to the destination facsimile machine. In this case, the destination facsimile machine repeats the processing of #6 in which the received data (PIX) on the page is temporarily stored in the image memory and in which the MCF signal is returned to the multifunctional machine 1. Afterward, until the multifunctional machine 1 completes the transmission of the data on all the pages which is a target for facsimile transmission to the destination facsimile machine, the processing of #5 and the processing of #6 are repeated.

Then, when the multifunctional machine 1 transmits the data (PIX) on the final page which is a target for facsimile transmission to the destination facsimile machine, the multifunctional machine 1 transmits, to the destination facsimile machine, an EOP signal indicating that the data transmission is completed (#7). The destination facsimile machine returns, to the multifunctional machine 1, the MCF signal indicating that the data on the final page is received (#8).

When the multifunctional machine 1 receives the MCF signal described above from the destination facsimile machine after the transmission of the EOP signal, the multifunctional machine 1 transmits a DCN signal to the destination facsimile machine and interrupts the line (#9).

Figure 3:
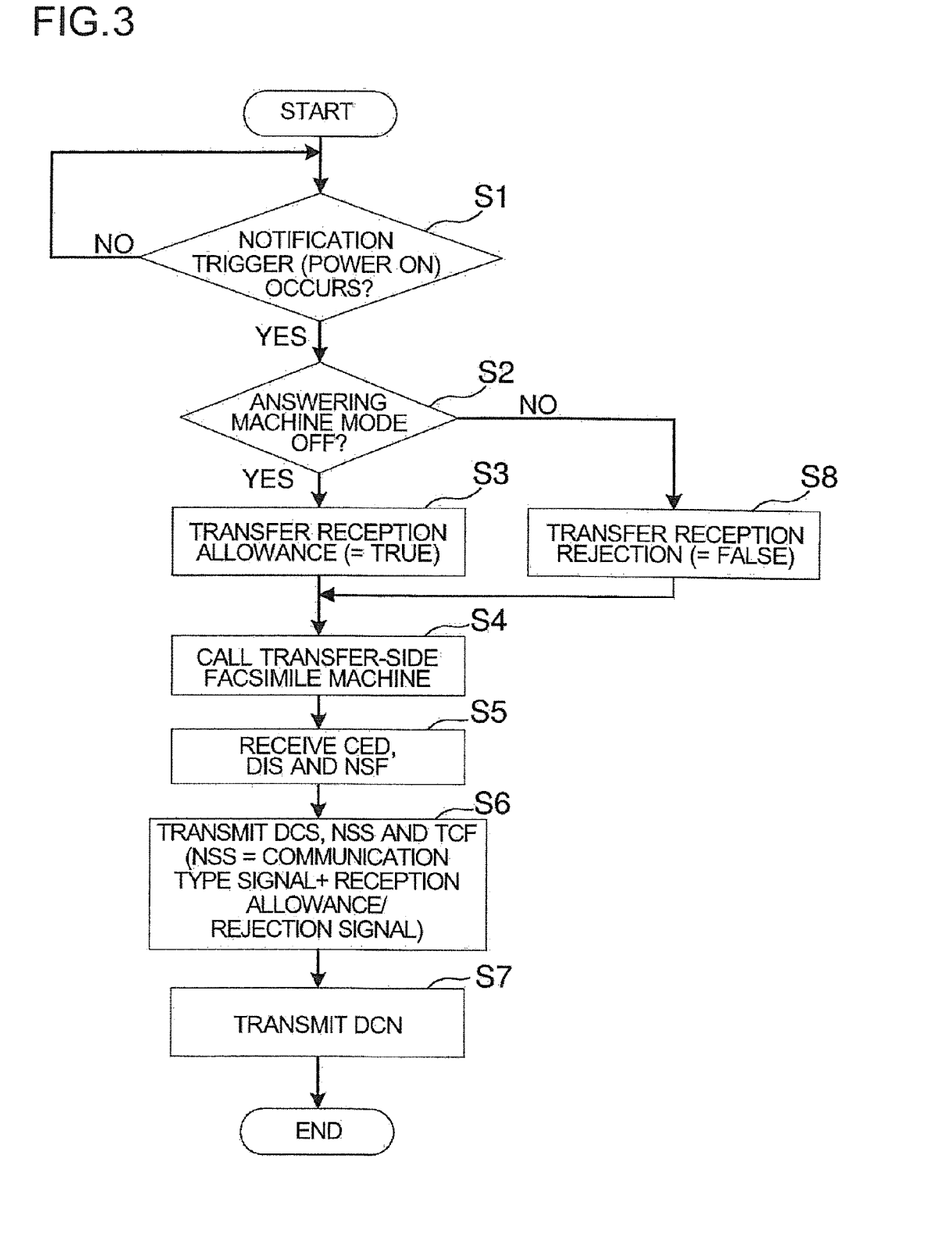
FIG. 3 A flowchart showing processing on facsimile data transfer when the multifunctional machine according to the first embodiment is a reception-side facsimile machine.

Processing on the facsimile data transfer when the multifunctional machine 1 according to the first embodiment is the reception-side facsimile machine will then be described. FIG. 3 is a flowchart showing the processing on the facsimile data transfer when the multifunctional machine 1 according to the first embodiment is the reception-side facsimile machine.

For example, when the user feeds power to the multifunctional machine 1, and the reception allowance/rejection setting portion 102 detects that the power of the multifunctional machine 1 is turned on (YES in S1), the reception allowance/rejection setting portion 102 determines whether or not the multifunctional machine 1 is set to the answering machine mode by the mode setting portion 103 (S2).

Here, when the reception allowance/rejection setting portion 102 determines that the multifunctional machine 1 is not set to the answering machine mode (YES in S2), the reception allowance/rejection setting portion 102 sets the transfer reception flag to the transfer reception flag=1 (true) such that a setting is made so as to allow the facsimile data which is a target to be transferred to be received by the multifunctional machine 1 serving as the reception-side facsimile machine from another facsimile machine (the transfer-side facsimile machine) previously determined as the facsimile machine for transferring the facsimile machine data (S3).

On the other hand, when the reception allowance/rejection setting portion 102 determines that the multifunctional machine 1 is set to the answering machine mode (NO in S2), the reception allowance/rejection setting portion 102 sets the transfer reception flag to the transfer reception flag=0 (false) such that a setting is made so as not to allow the reception of the facsimile data which is a target to be transferred by the multifunctional machine 1 (S8).

After the setting of the transfer reception flag in S3 or S8, the facsimile communication portion 140 on the reception side calls the previously set transfer-side facsimile machine to transmit the CNG signal (S4).

In response to the calling, the transfer-side facsimile machine returns the CED signal, the DIS signal and the NSF signal to the multifunctional machine 1, and the facsimile communication portion 140 of the multifunctional machine 1 receives these signals (S5). The facsimile communication portion 140 transmits the DCS signal in response to the NSF signal described above, and furthermore the NSS signal and the TCF signal to the transfer-side facsimile machine (S6). Here, the control portion 101 includes, in the NSS signal, the communication type signal indicating that the established facsimile communication is communication for transmitting the reception allowance/rejection signal and the reception allowance/rejection signal (the allowance or the rejection of the reception) indicating the detail of the transfer reception flag set in S3 or S8. Then, the control portion 101 transmits the NSS signal described above from the facsimile communication portion 140 to the transfer-side facsimile machine. Thereafter, the facsimile communication portion 140 transmits the DCN signal to the transfer-side facsimile machine (S7), and completes the communication.

In the above description, when the reception allowance/rejection setting portion 102 determines that the multifunctional machine 1 is not set to the answering machine mode (YES in S2), the transfer reception flag is set to the transfer reception flag=1 (true) (S3). However, the configuration is not limited to this, and for example, when the reception allowance/rejection selling portion 102 determines in S1 that the power is turned on, the processing in S2 may not be performed, and the transfer reception flag may be set to the transfer reception flag=1 (true). Alternatively, when in the multifunctional machine 1, another condition such as in which an instruction to allow the reception of the data transfer described above is input through the operation of the operation portion 47 by the user is satisfied, the reception allowance/rejection setting portion 102 may set the transfer reception flag to the transfer reception flag=1 (true).

Figure 4:
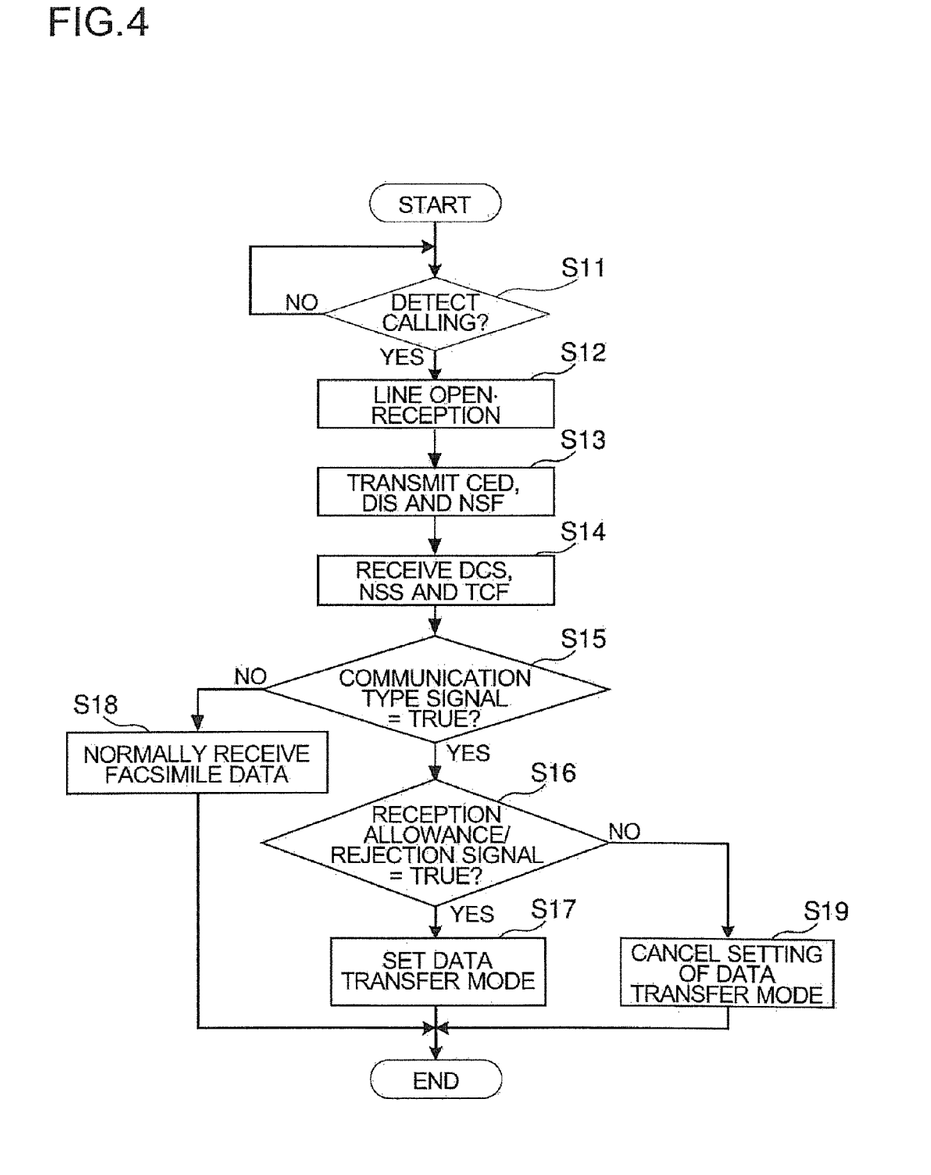
FIG. 4 A flowchart showing processing on facsimile data transfer when the multifunctional machine according to the first embodiment is the transfer-side facsimile machine.

Processing on the facsimile data transfer when the multifunctional machine 1 according to the first embodiment is the reception-side facsimile machine will then be described. FIG. 4 is a flowchart showing the processing on the facsimile data transfer when the multifunctional machine 1 according to the first embodiment is the reception-side facsimile machine.

When the multifunctional machine 1 is the transfer-side facsimile machine (hereinafter simply referred to as the transfer-side facsimile machine), a series of processing steps shown in FIG. 3 are performed, and the call from the multifunctional machine 1 serving as the reception-side facsimile machine (S4 in FIG. 3) is received by the facsimile communication portion 140 of the transfer-side facsimile machine (YES in S11). The transfer-side facsimile machine receives this call, and opens and establishes the line to the reception-side facsimile machine (S12). Then, the facsimile communication portion 140 sends back, to the reception-side facsimile machine, the CED signal, the DIS signal serving as the non-standard function identification signal indicating the optional function of itself and the NSF signal (S13).

In response to this, the reception-side facsimile machine returns the NSF signal in response to the NSF signal described above, and furthermore, the DCS signal and the TCF signal to the transfer-side facsimile machine. When the facsimile communication portion 140 of the transfer-side facsimile machine receives these signals (S14), the data transfer setting portion 104 determines whether or not the communication type signal included in the NSS signal indicates that the facsimile communication is the transfer setting communication (S15). When it is determined that the communication type signal is not a signal indicating the transfer setting communication (NO in S15), the control portion 101 performs reception control on the normal facsimile data (S18). In other words, the facsimile communication portion 140 of the transfer-side facsimile machine determines that the call from the reception-side facsimile machine detected in S1 described above is a call indicating the communication for transmitting the facsimile data as normally, returns the CFR signal to the reception-side facsimile machine and thereafter performs the processing of #4 to #9 shown in FIG. 2 so as to receive the facsimile data from the reception-side facsimile machine.

When the data transfer setting portion 104 determines that the communication type signal indicates the transfer setting communication (YES in S15), the data transfer setting portion 104 determines whether or not the reception allowance/rejection signal further included in the NSS signal indicates that the reception of the facsimile data which is a target to be transferred is allowed by the reception-side facsimile machine (S16). Here, when the data transfer setting portion 104 determines that the reception allowance/rejection signal indicates that the reception of the facsimile data which is a target to be transferred is allowed (reception allowance/rejection=true) (YES in S16), the data transfer setting portion 104 sets the data transfer flag and stores it (data transfer flag=1 (true)). In other words, when the data transfer setting portion 104 thereafter receives, from another facsimile machine, the facsimile data which is a target to be transferred to the reception-side facsimile machine, the data transfer setting portion 104 sets the transfer-side facsimile machine to a data transfer mode in which the processing for transferring the facsimile data to the reception-side facsimile machine is performed (S17).

On the other hand, even when the data transfer setting portion 104 determines that the reception allowance/rejection signal indicates that the reception of the transfer data is not allowed (NO in S16), and thereafter the data transfer setting portion 104 receives the facsimile data which is a target to be transferred to the reception-side facsimile machine, the data transfer setting portion 104 does not set the data transfer flag and stores it (data transfer flag=0 (false)). The data transfer setting portion 104 cancels the setting of the data transfer mode such that even when the data transfer setting portion 104 thereafter receives the facsimile data which is a target to be transferred to the reception-side facsimile machine, the facsimile data is prevented from being transferred to the reception-side facsimile machine (S18).

Figure 5:
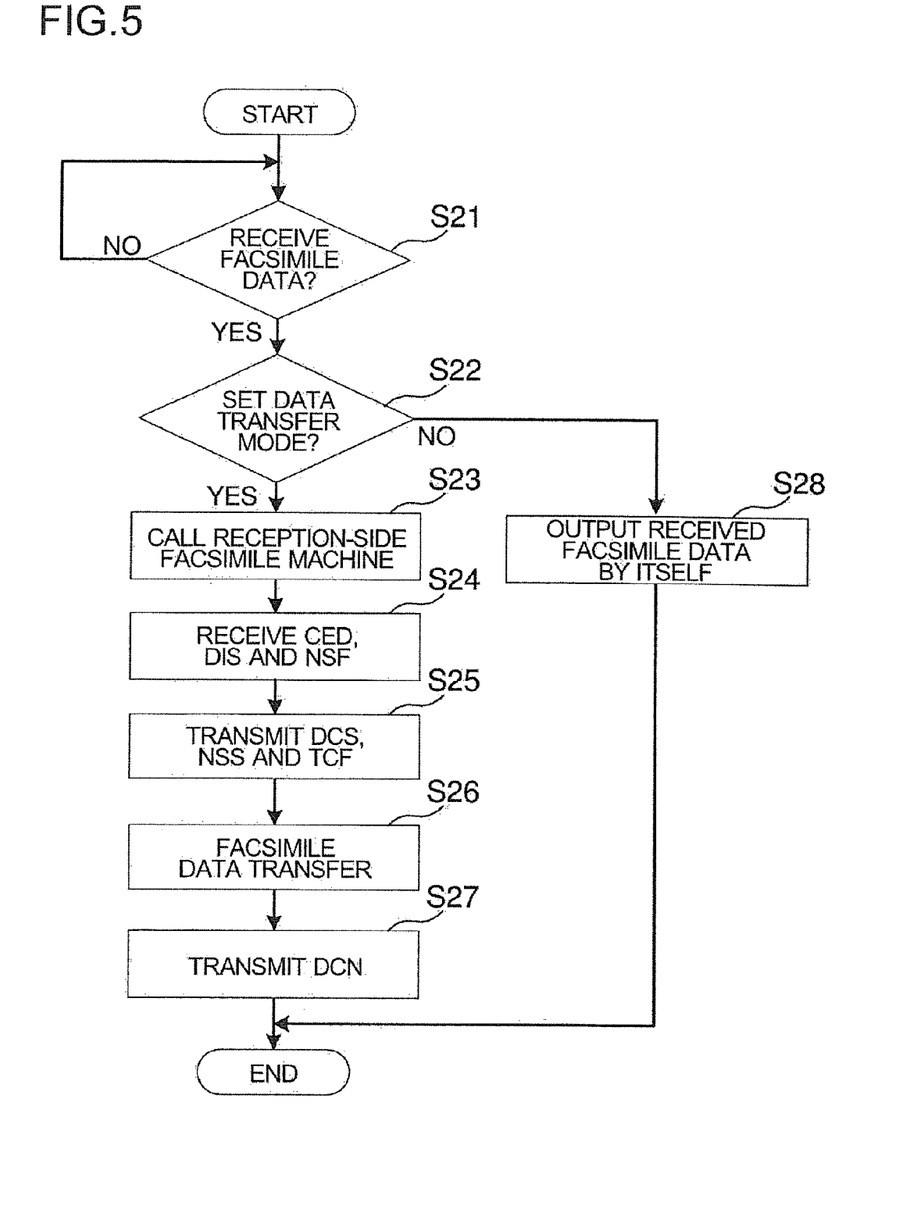
FIG. 5 A flowchart showing processing for transferring facsimile data which is a target to be transferred to the reception-side facsimile machine when the multifunctional machine according to the first embodiment is a transfer-side facsimile machine.

Processing for transferring the facsimile data which is a target to be transferred to the reception-side facsimile machine when the multifunctional machine 1 according to the first embodiment is the transfer-side facsimile machine will then be described. FIG. 5 is a flowchart showing the processing for transferring the facsimile data which is a target to be transferred to the reception-side facsimile machine when the multifunctional machine 1 according to the first embodiment is the transfer-side facsimile machine.

When in the transfer-side facsimile machine, the facsimile communication portion 140 receives, from another facsimile machine, the facsimile data which is a target to be transferred to the reception-side facsimile machine (YES in S21), the control portion 101 determines whether or not the data transfer flag of the data transfer setting portion 104 is set (whether or not the data transfer mode is set) (S22).

Here, when the control portion 101 determines that the data transfer flag is set and that the data transfer mode is set (YES in S22), the control portion 101 makes the facsimile communication portion 140 call the reception-side facsimile machine serving as the data destination (S23). Alternatively, when the control portion 101 determines that the data transfer flag is not set and that the data transfer mode is not set (NO in S22), the control portion 101 makes the image formation portion 130 perform image formation on the facsimile data received in S21 (S28). In other words, the transfer-side facsimile machine does not transfer the facsimile data received in S21, and outputs it by itself.

Then, when in response to the call described above, the return of the CED signal, the DIS signal and the NSF signal is received from the reception-side facsimile machine (S24), the DCS signal, the NSS signal and the TCF signal are transmitted from the facsimile communication portion 140 to the reception-side facsimile machine (S25). The control portion 101 waits for the return of the CFR signal from the reception-side facsimile machine, performs the processing of #5 to #7 shown in FIG. 2 on the facsimile data which is received in S21 and which is a target to be transferred and thereby makes the facsimile communication portion 140 transmit it to the reception-side facsimile machine (S26).

When the facsimile communication portion 140 of the transfer-side facsimile machine transmits data on the final page in the facsimile data which is a target to be transferred, and thereafter receives the MCF signal from the reception-side facsimile machine, the facsimile communication portion 140 transmits the DCN signal to the reception-side facsimile machine and completes the facsimile communication (S27).

As described above, in the first embodiment, it is possible to set whether or not the facsimile data is transferred from the reception-side facsimile machine to the transfer-side facsimile machine. Hence, for example, the user makes a setting such that facsimile data received by a facsimile machine at a head office is transferred to a facsimile machine installed at a branch office to which the user is on a business trip (the user can receive the facsimile data at the branch office to which the user is on a business trip), and when the user returns to the head office, the user leaves the branch office after the setting is switched to a setting such that the facsimile machine at the head office serves as the reception-side facsimile machine to prevent the transfer to the facsimile machine at the head office serving as the transfer-side facsimile machine. Thus, it is possible to avoid a situation in which while the user is returning to the head office, the facsimile data is transferred from the transfer-side facsimile machine at the head office to the reception-side facsimile machine at the branch office, with the result that the user cannot receive the facsimile data at the head office. In this way, the user can reliably receive the facsimile data transferred between both the facsimile machines at the facsimile machine installed at the place desired by the user. The same is true for the case where the user transfers facsimile data between both the facsimile machines at home and at the workplace.

The communication type signal and the transfer reception allowance/rejection signal included in the NSS signal are transmitted from the reception-side facsimile machine to the transfer-side facsimile machine. Hence, the transfer-side facsimile machine can distinguish, based on the communication type signal, the normal facsimile communication from the communication for setting the allowance or the rejection of the transfer of the facsimile data which is a target to be transferred. It is possible to realize the communication necessary for the transfer setting with a protocol used for facsimile communication.

When the reception-side facsimile machine is set to the answering machine mode, the reception of the transfer of the facsimile data is not allowed whereas when the reception-side facsimile machine is not set to the answering machine mode, the reception of the transfer of the facsimile data is allowed. In this way, when the probability that the user is present at the place where the reception-side facsimile machine is installed is high, the transfer-side facsimile machine is made to transfer the facsimile data whereas when the probability that the user is present at the place where the reception-side facsimile machine is installed is low, it is possible to prevent the facsimile data from being transferred.

The transfer-side facsimile machine sets, based on the detail indicated by the transfer reception allowance/rejection signal received as the NSS signal from the reception-side facsimile machine, whether or not the facsimile data which is a target to be transferred is transferred. Hence, it is possible to set, according to an instruction from the reception-side facsimile machine, as necessary, whether or not the facsimile data is transferred. From this point, the user can reliably receive the facsimile data transferred between both the facsimile machines at the facsimile machine installed at the place desired by the user.

The transfer-side facsimile machine and the reception-side facsimile machine that perform the transfer processing on the facsimile data described above form an embodiment of a facsimile communication system according to the present disclosure.

Figure 6:
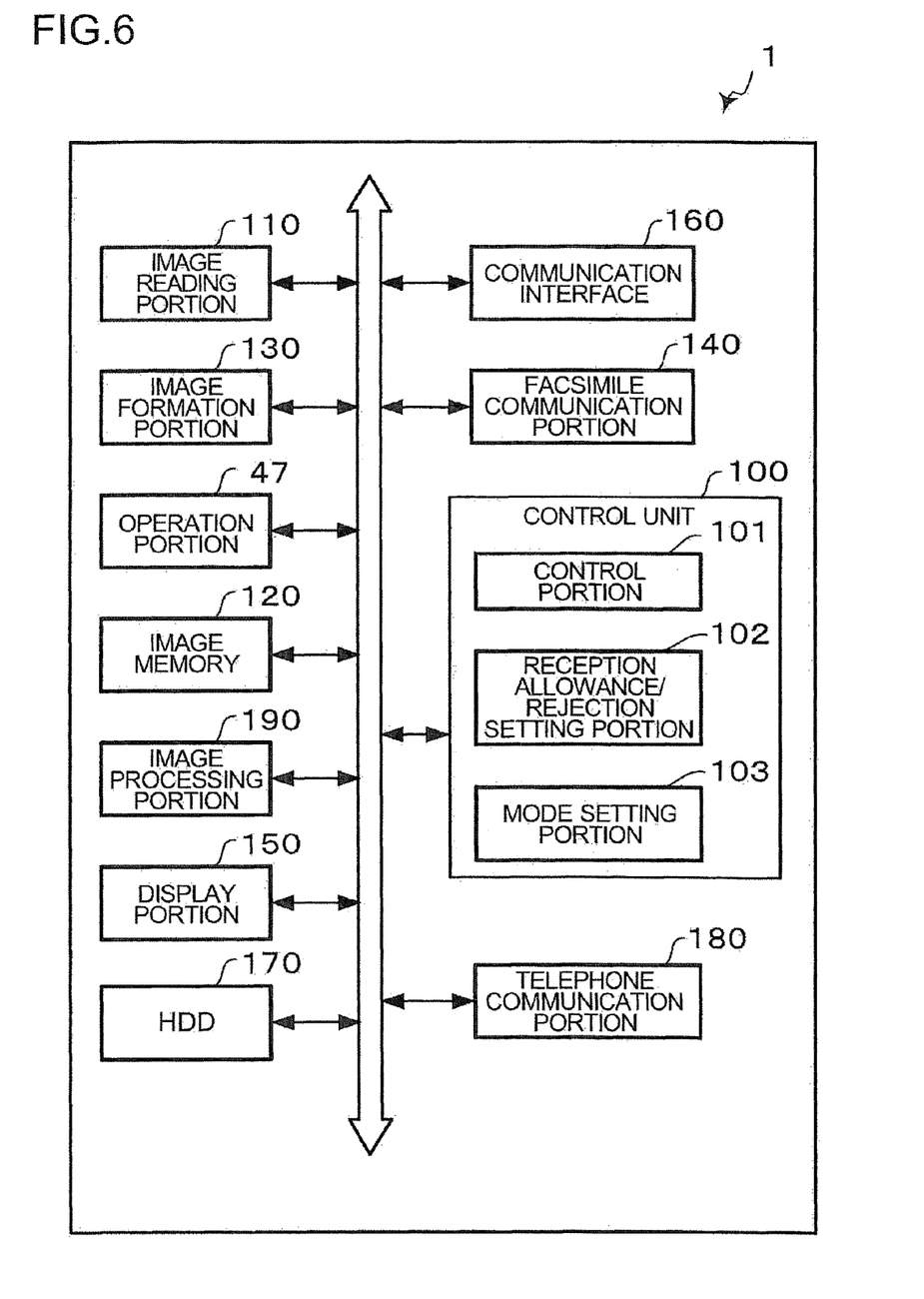
FIG. 6 A block diagram schematically showing the internal configuration of a multifunctional machine serving as a facsimile machine according to a second embodiment of the present disclosure.

A facsimile machine and a facsimile communication program according to a second embodiment of the present disclosure will then be described with reference to drawings. FIG. 6 is a block diagram schematically showing the internal configuration of a multifunctional machine serving as the facsimile machine according to the second embodiment of the present disclosure. The description of the same configurations as in the first embodiment shown in FIG. 1 will be omitted.

In the multifunctional machine 1 according to the second embodiment, the control unit 100 includes, as in the first embodiment, the control portion 101, the reception allowance/rejection setting portion 102 and the mode setting portion 103. However, the data transfer setting portion 104 is excluded.

Figure 7:
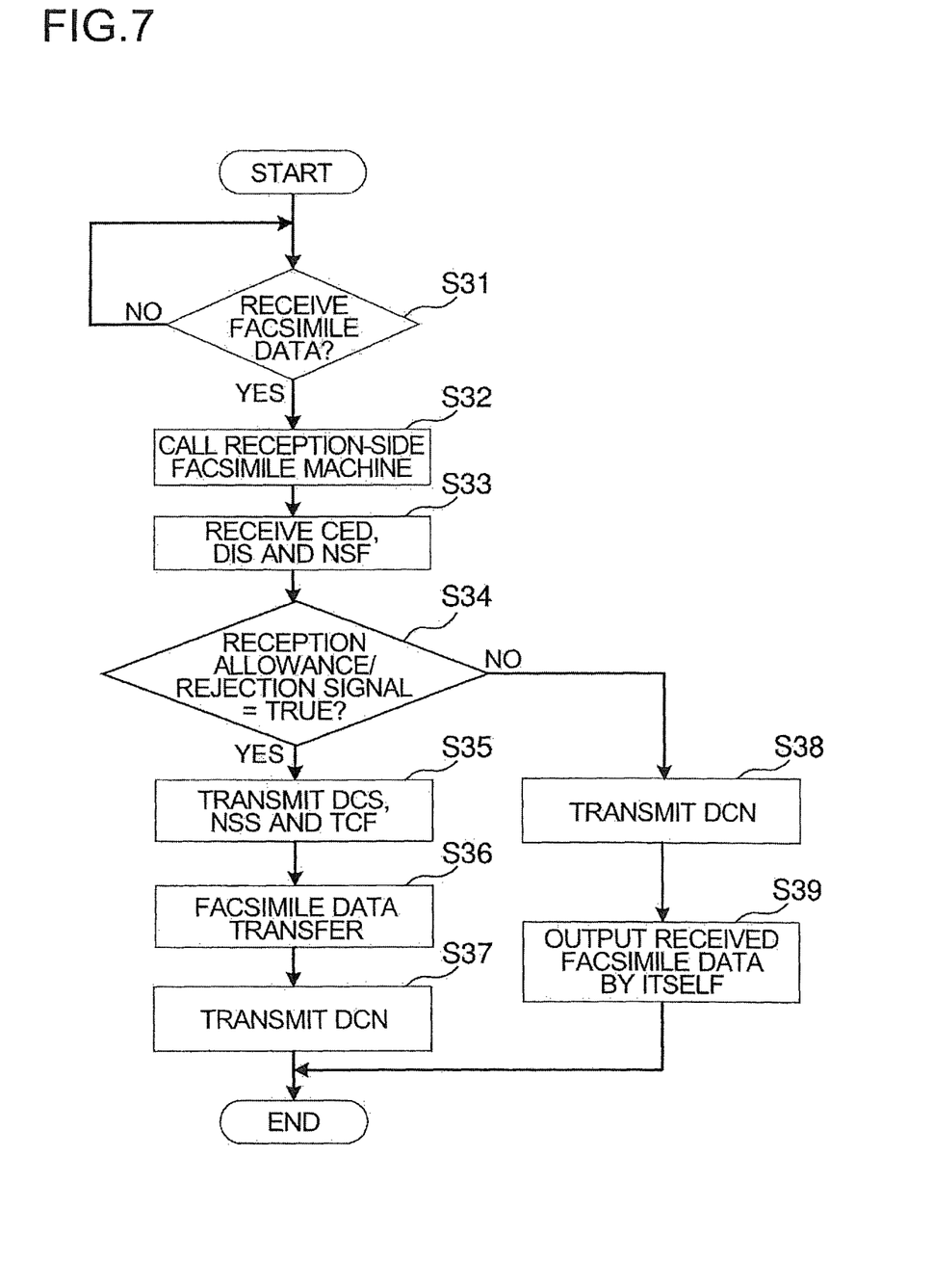
FIG. 7 A flowchart showing processing on facsimile data transfer when the multifunctional machine according to the second embodiment is the transfer-side facsimile machine.

Processing on the facsimile data transfer when the multifunctional machine 1 according to the second embodiment is the transfer-side facsimile machine will then be described. FIG. 7 is a flowchart showing the processing on the facsimile data transfer when the multifunctional machine 1 according to the second embodiment is the transfer-side facsimile machine.

When the multifunctional machine 1 is the transfer-side facsimile machine, and the facsimile communication portion 140 on the transfer side receives the facsimile data which is a target to be transferred to the reception-side facsimile machine (YES in S31), the control portion 101 on the transfer side makes the facsimile communication portion 140 call the reception-side facsimile machine serving as the data destination (S32).

Then, in response to the calling, the return of the CED signal, the DIS signal and the NSF signal from the reception-side facsimile machine is received by the facsimile communication portion 140 (S33). The control portion 101 determines whether or not the reception allowance/rejection signal included in the NSF signal indicates the allowance of the reception of the facsimile data transmitted as a target to be transferred (S34).

Here, when the control portion 101 determines that the reception allowance/rejection signal included in the NSF signal indicates the allowance of the reception (YES in S34), the facsimile communication portion 140 transmits the DCS signal, the NSS signal and the TCF signal to the reception-side facsimile machine (S35). The control portion 101 waits for the return of the CFR signal from the reception-side facsimile machine, and the facsimile communication portion 140 on the transfer side performs the processing of #5 to #7 shown in FIG. 2 on the facsimile data which is received in S31 and which is a target to be transferred, and thereby transmits it to the reception-side facsimile machine (S36). In other words, in the first embodiment, the transfer-side facsimile machine previously receives, from the reception-side facsimile machine, the signal notifying whether or not the reception of the transfer is allowed. On the other hand, in the second embodiment, the transfer-side facsimile machine checks whether or not the facsimile data is allowed to be transferred to the destination (the reception-side facsimile machine) each time the facsimile data is received.

Then, after the data on the final page in the facsimile data which is a target to be transferred is received, when the MCF signal is received from the reception-side facsimile machine, the facsimile communication portion 140 transmits the DCN signal to the reception-side facsimile machine and completes the facsimile communication (S37).

On the other hand, when the control portion 101 determines that the reception allowance/rejection signal indicates the rejection of the reception (NO in S34), the facsimile communication portion 140 transmits the DCN signal to the reception-side facsimile machine and completes the facsimile communication with the reception-side facsimile machine (S38). Then, the control portion 101 makes the image formation portion 130 form the image of the facsimile data received in S31 (S39). In other words, the transfer-side facsimile machine does not transfer the facsimile data received in S31, and outputs it by itself.

Figure 8:
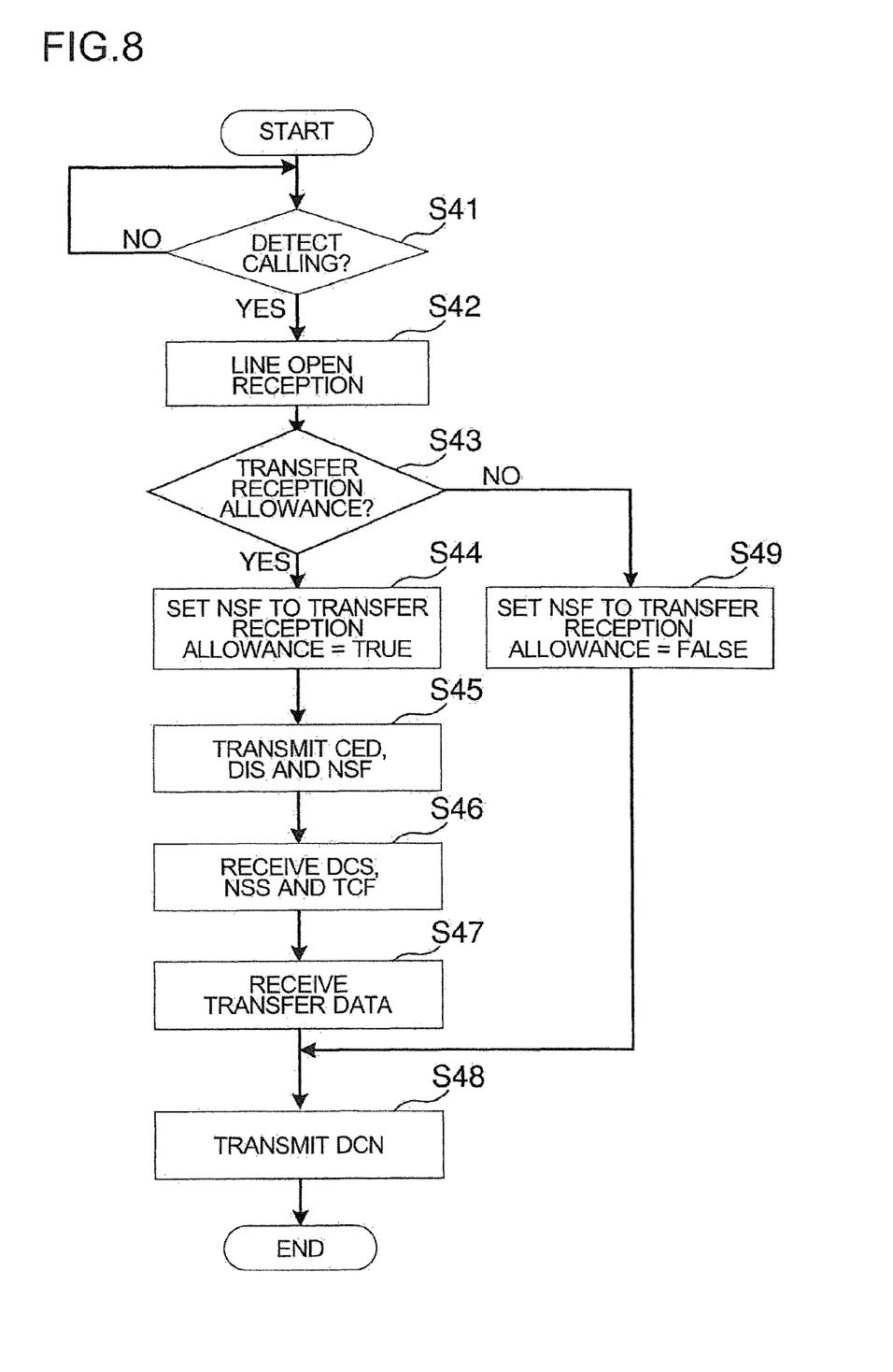
FIG. 8 A flowchart showing processing on facsimile data transfer when the multifunctional machine according to the second embodiment is the reception-side facsimile machine.

Processing on the facsimile data transfer when the multifunctional machine 1 according to the second embodiment is the reception-side facsimile machine will then be described. FIG. 8 is a flowchart showing the processing on the facsimile data transfer when the multifunctional machine 1 according to the second embodiment is the reception-side facsimile machine.

When the multifunctional machine 1 is the reception-side facsimile machine, and the calling from the transfer-side facsimile machine is received through the processing of S32 shown in FIG. 7 by the facsimile communication portion 140 of the reception-side facsimile machine (YES in S41), the multifunctional machine 1 opens and establishes the line with the transfer-side facsimile machine (S42).

Then, the reception allowance/rejection setting portion 102 determines whether the transfer reception flag is the transfer reception flag=1 (true) or the transfer reception flag=0 (false) (S43). When the reception allowance/rejection setting portion 102 determines that the transfer reception flag is the transfer reception flag=1 (true) (YES in S43), in order to make a setting such that the reception of the facsimile data to be transferred by the multifunctional machine 1 is allowed, the reception allowance/rejection setting portion 102 sets the NSF signal to the reception allowance/rejection=true (S44). The method of setting the transfer reception allowance/rejection by the reception allowance/rejection setting portion 102 is the same as in the first embodiment.

Then, the facsimile communication portion 140 sends back, to the transfer-side facsimile machine, the CED signal, the NSF signal the detail of which is set in S44 and the DIS signal (S45).

In response to this, the transfer-side facsimile machine returns the NSS signal in response to the NSF signal described above, and furthermore, the DCS signal and the TCF signal, and the facsimile communication portion 140 of the reception-side facsimile machine receives these signals (S46). Thereafter, in order to receive the facsimile data from the transfer-side facsimile machine, the processing of #3 to #9 in FIG. 2 is performed to receive the facsimile data which is a target to be transferred (S4). Thereafter, the multifunctional machine 1 receives the DCN signal transmitted from the transfer-side facsimile machine (S48) and completes the communication.

On the other hand, when the reception allowance/rejection setting portion 102 determines that the transfer reception flag is the transfer reception flag=0 (false) (NO in S43), in order to make a setting such that the reception of the facsimile data to be transferred by the multifunctional machine 1 is not allowed, the reception allowance/rejection setting portion 102 sets the NSF signal to the transfer reception rejection=false, and the facsimile communication portion 140 sends back, to the transfer-side facsimile machine, the CED signal, the set NSF signal and the DIS signal (S48) Thereafter, the DCN signal transmitted from the transfer-side facsimile machine is received, and the communication is completed.

As described above, in the second embodiment, when the transfer-side facsimile machine starts to perform the communication for transferring the facsimile data, the reception-side facsimile machine determines, according to the response from the reception-side facsimile machine, whether or not the reception of the transfer of the facsimile data is allowed. Hence, as in the first embodiment, the user can reliably receive the facsimile data transferred between both the facsimile machines at the facsimile machine installed at the place desired by the user.

The transfer-side facsimile machine sets, based on the detail indicated by the transfer reception allowance/rejection signal received as the NSF signal from the reception-side facsimile machine, whether or not the facsimile data which is a target to be transferred is transferred. Hence, it is possible to set, according to an instruction from the reception-side facsimile machine, as necessary, whether or not the facsimile data is transferred. From this point, the user can reliably receive the facsimile data transferred between both the facsimile machines at the facsimile machine installed at the place desired by the user.

The present disclosure is not limited to the configurations of the embodiments described above, and various variations are possible. The configuration and the processing indicated in each of the embodiments described above with reference to FIGS. 1 to 8 are simply an embodiment of the present disclosure, and the configurations and the processing of the present disclosure are not limited to this.

What is claimed is:

1. A transfer-side facsimile machine comprising:
    a transfer-side facsimile communication portion that performs facsimile communication;
    a transfer-side control portion that controls transfer, to a reception-side facsimile machine, of facsimile data which is received from another facsimile machine and which is a target to be transferred to the reception-side facsimile machine; and
    a data transfer setting portion that, when the transfer-side facsimile machine receives a reception allowance/rejection signal,
        sets the transfer-side facsimile machine to a data transfer mode if the reception allowance/rejection signal indicates reception allowance of the facsimile data which is the target to be transferred and
        cancels the data transfer mode of the transfer-side facsimile machine if the reception allowance/rejection signal indicates reception rejection,
        the reception allowance/rejection signal being a signal which is received based on calling of the reception-side facsimile machine, which indicates a detail of reception allowance/rejection of facsimile data transferred from the transfer-side facsimile machine, and which uses a communication signal in a previously determined facsimile communication protocol,
    wherein when the facsimile data which is the target to be transferred to the reception-side facsimile machine is received from the other facsimile machine in the data transfer mode, the transfer-side control portion makes the transfer-side facsimile communication portion transfer the facsimile data which is the target to be transferred to the reception-side facsimile machine, and
    when the facsimile data which is the target to be transferred to the reception-side facsimile machine is received from the other facsimile machine outside the data transfer mode, the transfer-side control portion makes an image formation portion print the facsimile data received from the other facsimile machine.

2. The transfer-side facsimile machine according to claim 1,
    wherein when the reception allowance/rejection signal received by the transfer-side facsimile communication portion indicates the reception rejection of the facsimile data which is the target to be transferred, the transfer-side control portion makes the transfer-side facsimile communication portion complete the communication with the reception-side facsimile machine.

3. The transfer-side facsimile machine according to claim 1,
wherein when the transfer-side facsimile communication portion receives the facsimile data, the transfer-side control portion
makes the transfer-side facsimile communication portion call the reception-side facsimile machine serving as a data destination and
determines whether or not the reception allowance/rejection signal included in the signal from the reception-side facsimile machine which responds to the calling indicates reception allowance of the transfer of the facsimile data, and
when the transfer-side control portion determines that the reception allowance/rejection signal indicates the reception allowance, the transfer-side facsimile communication portion transmits, to the reception-side facsimile machine, the received facsimile data which is the target to be transferred whereas when the transfer-side control portion determines that the reception allowance/rejection signal indicates reception rejection, the transfer-side facsimile communication portion does not transfer the facsimile data.

4. A facsimile communication system comprising:
the transfer-side facsimile machine according to claim 1; and
the reception-side facsimile machine,
wherein the reception-side facsimile machine includes:
a reception allowance/rejection setting portion that sets reception allowance/rejection indicating whether or not the facsimile data which is transferred from the transfer-side facsimile machine and which is the target to be transferred is received;
a reception-side facsimile communication portion that performs facsimile communication; and
a reception-side control portion that transmits, from the reception-side facsimile communication portion to the transfer-side facsimile machine, the reception allowance/rejection signal which indicates, when the facsimile communication with the transfer-side facsimile machine is established according to calling from the reception-side facsimile machine based on a previously determined trigger, a detail of the reception allowance/rejection set by the reception allowance/rejection setting portion and which uses the communication signal in the previously determined facsimile communication protocol.

5. The facsimile communication system according to claim 4,
wherein when the reception-side control portion of the reception-side facsimile machine transmits the reception allowance/rejection signal indicating reception allowance of transfer data from the reception-side facsimile communication portion to the transfer-side facsimile machine, the reception-side facsimile communication portion receives the facsimile data transferred from the transfer-side facsimile machine.

6. The facsimile communication system according to claim 4,
wherein when the reception-side control portion transmits the reception allowance/rejection signal indicating reception rejection of transfer data from the reception-side facsimile communication portion to the transfer-side facsimile machine, the reception-side facsimile communication portion is made to complete the communication with the transfer-side facsimile machine.

7. The facsimile communication system according to claim 4,
wherein the reception-side facsimile machine includes a mode setting portion that sets the reception-side facsimile machine to an answering machine mode,
the reception allowance/rejection setting portion determines whether or not the reception-side facsimile machine is in the answering machine mode, and when the reception-side facsimile machine is not in the answering machine mode, sets a transfer reception flag at such a value that reception of the facsimile data which is the target to be transferred is allowed whereas when the reception-side facsimile machine is in the answering machine mode, sets the transfer reception flag at such a value that the reception of the facsimile data which is the target to be transferred is not allowed and
the reception-side control portion makes the reception-side facsimile communication portion transmit, to the transfer-side facsimile machine, the reception allowance/rejection signal indicating a detail of the transfer reception flag which is set.

8. The facsimile communication system according to claim 7,
wherein the reception-side control portion makes the reception-side facsimile communication portion transmit, to the transfer-side facsimile machine, a signal in which the reception allowance/rejection signal indicating the detail of the transfer reception flag that is set includes a communication type signal a detail of which indicates that the established facsimile communication is communication for transmitting the reception allowance/rejection signal.

9. A reception-side facsimile machine comprising:
a reception allowance/rejection setting portion that sets reception allowance/rejection indicating whether or not transfer data transferred from the transfer-side facsimile machine is received;
a reception-side facsimile communication portion that performs facsimile communication with the transfer-side facsimile machine; and
a reception-side control portion that transmits, from the reception-side facsimile communication portion to the transfer-side facsimile machine, a reception allowance/rejection signal which indicates, when the facsimile communication with the transfer-side facsimile machine is established in response to calling from the reception-side facsimile machine based on a previously determined trigger, a detail of the reception allowance/rejection set by the reception allowance/rejection setting portion and which uses a communication signal in a previously determined facsimile communication protocol.

10. The reception-side facsimile machine according to claim 9,
wherein when the reception-side control portion of the reception-side facsimile machine transmits the reception allowance/rejection signal indicating reception allowance of the transfer data from the reception-side facsimile communication portion to the transfer-side facsimile machine, the reception-side facsimile communication portion receives the facsimile data transferred from the transfer-side facsimile machine.

11. The reception-side facsimile machine according to claim 9, further comprising:

a mode setting portion that sets the reception-side facsimile machine to an answering machine mode, wherein the reception allowance/rejection setting portion determines whether or not the reception-side facsimile machine is in the answering machine mode, and when the reception-side facsimile machine is not in the answering machine mode, sets a transfer reception flag at such a value that reception of the facsimile data which is a target to be transferred is allowed whereas when the reception-side facsimile machine is in the answering machine mode, sets the transfer reception flag at such a value that the reception of the facsimile data which is the target to be transferred is not allowed and the reception-side control portion makes the reception-side facsimile communication portion transmit, to the transfer-side facsimile machine, the reception allowance/rejection signal indicating a detail of the transfer reception flag which is set.

12. The reception-side facsimile machine according to claim 11, wherein the reception-side control portion makes the reception-side facsimile communication portion transmit, to the transfer-side facsimile machine, a signal in which the reception allowance/rejection signal indicating the detail of the transfer reception flag that is set includes a communication type signal a detail of which indicates that the established facsimile communication is communication for transmitting the reception allowance/rejection signal.

\* \* \* \* \*